Figure 1:
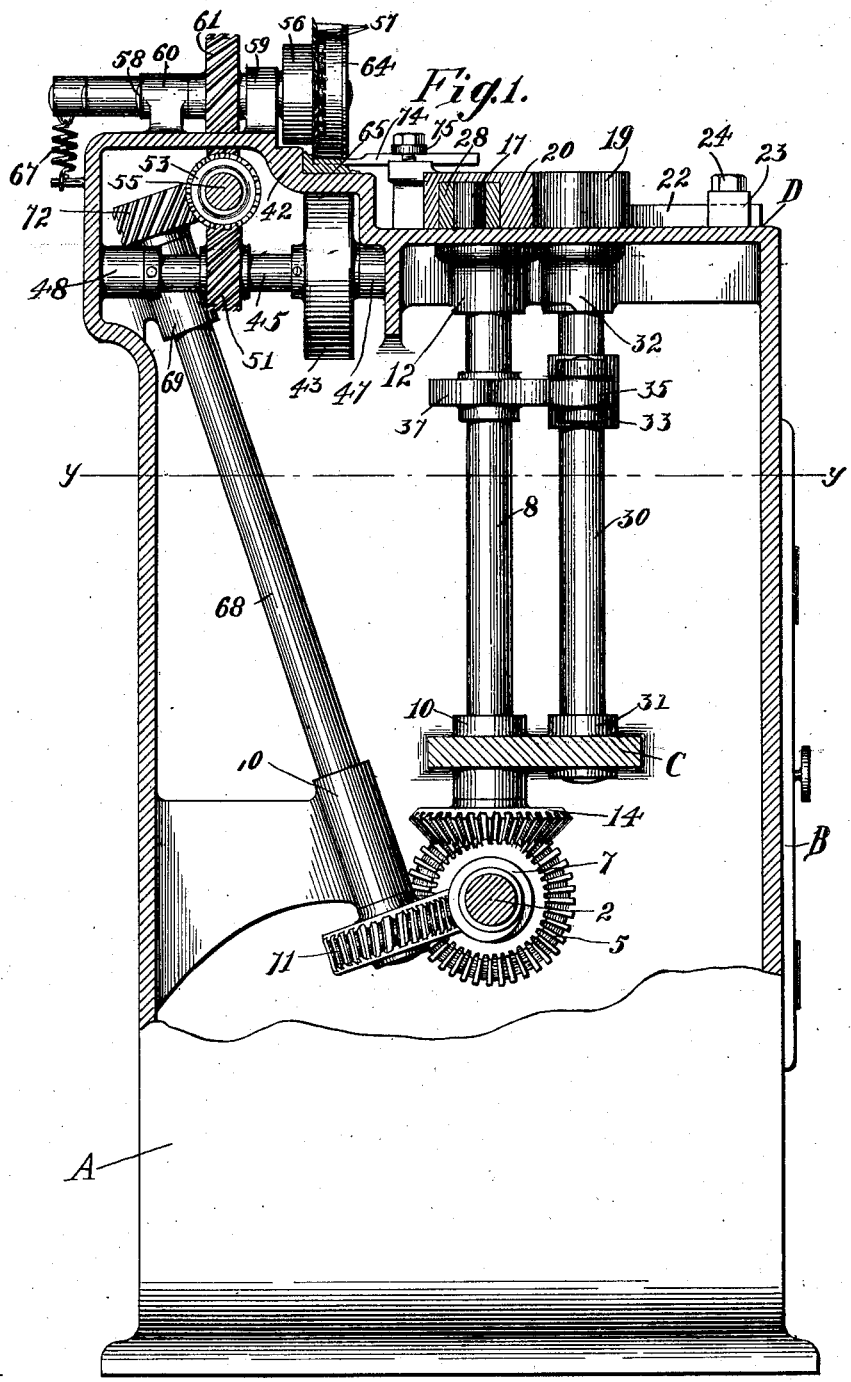

No. 888,534. PATENTED MAY 26, 1908.
F. H. RICHARDS.
CARVING MACHINE.
APPLICATION FILED AUG. 16, 1902. RENEWED OCT. 28, 1905.

5 SHEETS—SHEET 1.

Witnesses:
F. G. Hachenberg.
Marcus Hopkins.

Inventor:
F. H. Richards.

No. 888,534. PATENTED MAY 26, 1908.
F. H. RICHARDS.
CARVING MACHINE.
APPLICATION FILED AUG. 16, 1902. RENEWED OCT. 28, 1905.

5 SHEETS—SHEET 2.

Witnesses:
F. G. Hachenburg.
Marcus G. Hopkins

Inventor:
F. H. Richards.

THE NORRIS PETERS CO., WASHINGTON, D. C.

No. 888,534. PATENTED MAY 26, 1908.
F. H. RICHARDS.
CARVING MACHINE.
APPLICATION FILED AUG. 16, 1902. RENEWED OCT. 28, 1905.
5 SHEETS—SHEET 3.
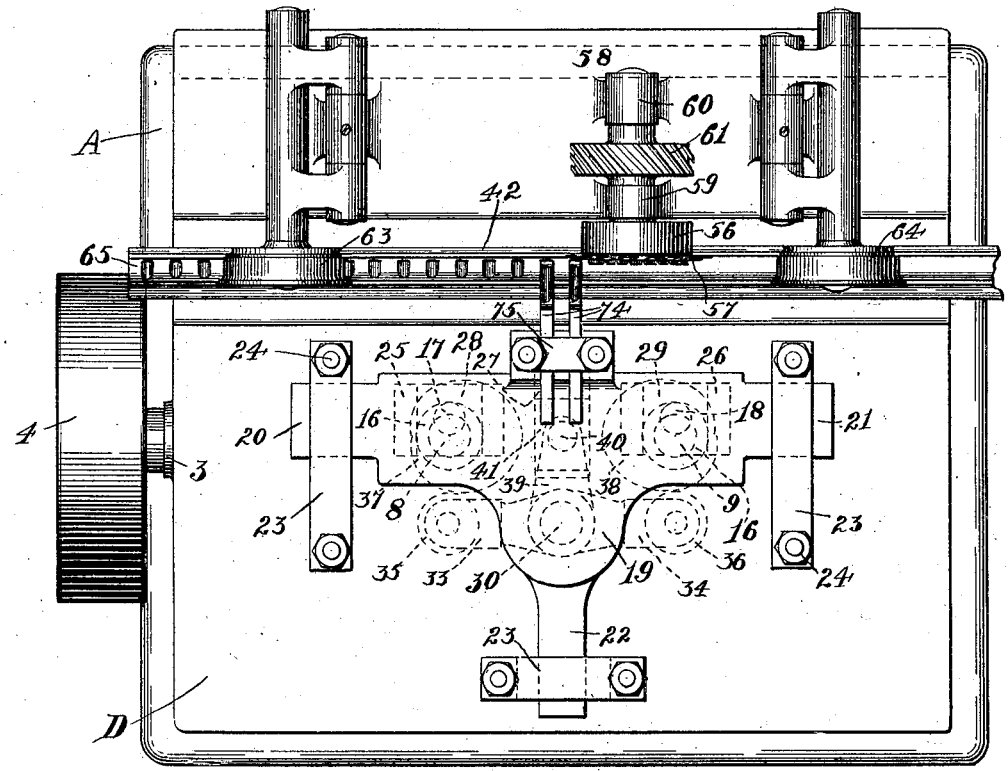
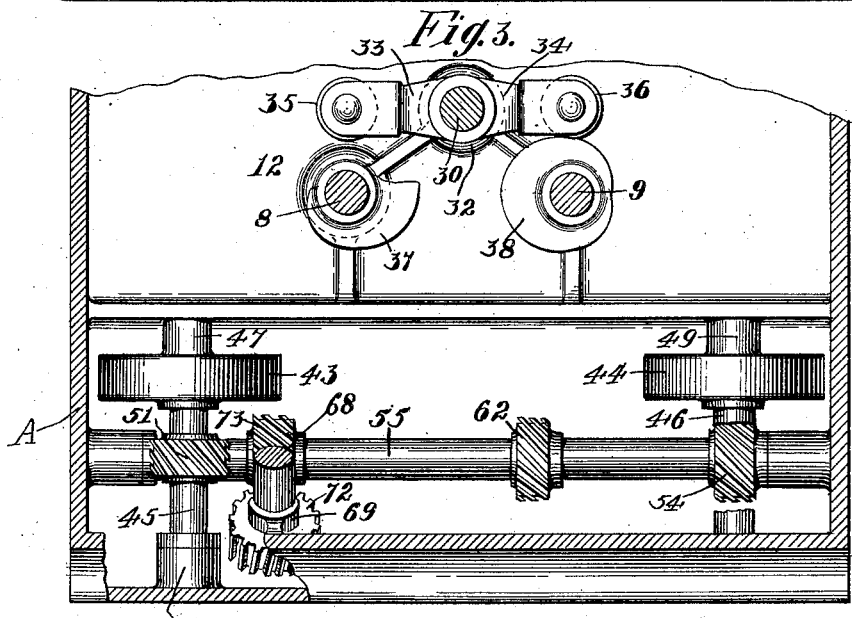
Witnesses: Inventor:

No. 888,534. PATENTED MAY 26, 1908.
F. H. RICHARDS.
CARVING MACHINE.
APPLICATION FILED AUG. 16, 1902. RENEWED OCT. 28, 1905.
5 SHEETS—SHEET 4.
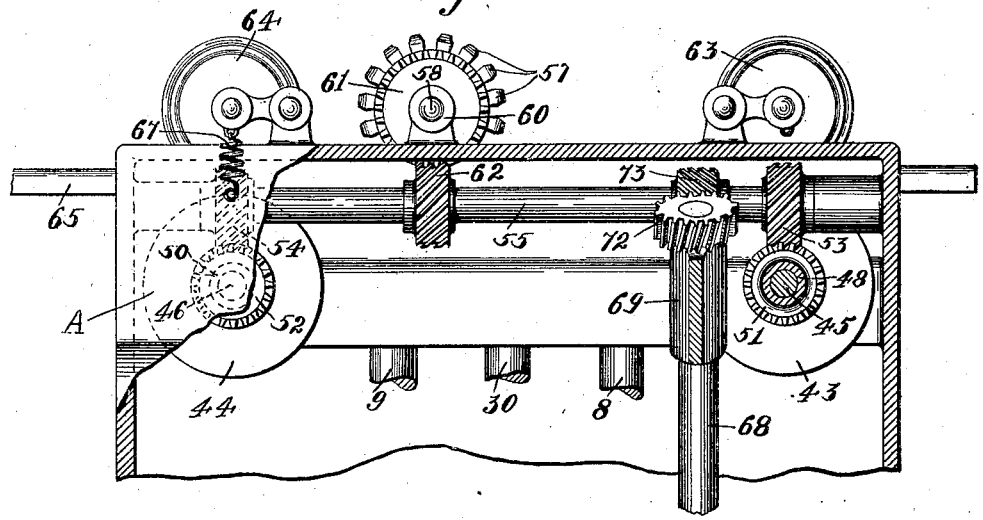
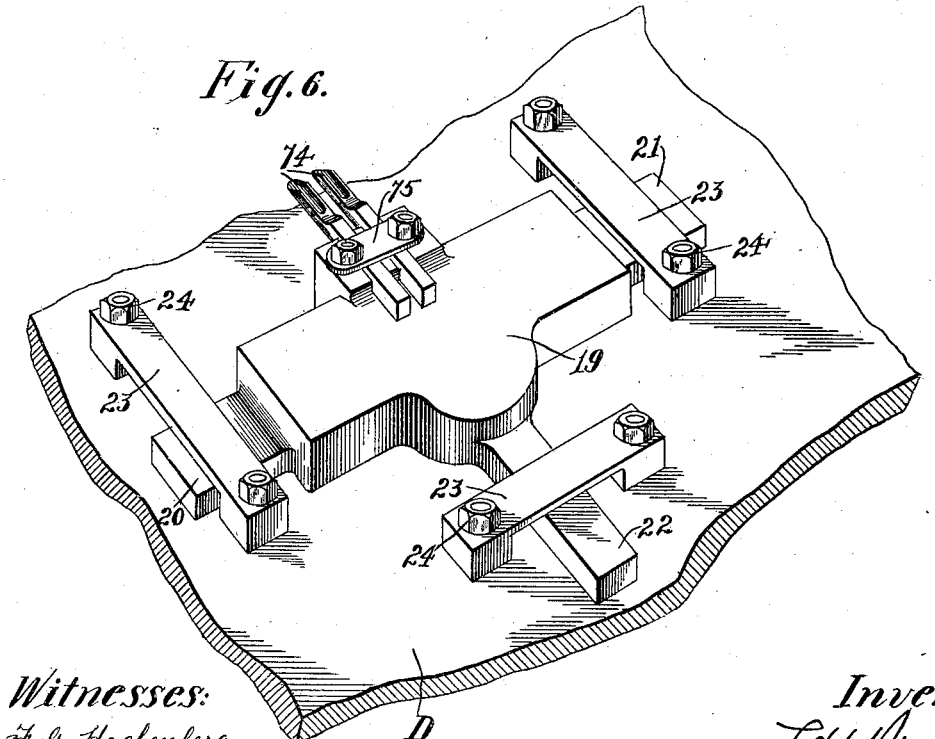
Witnesses:
F. G. Hachenberg.
Marcus D. Hopkins
Inventor:
F. H. Richards

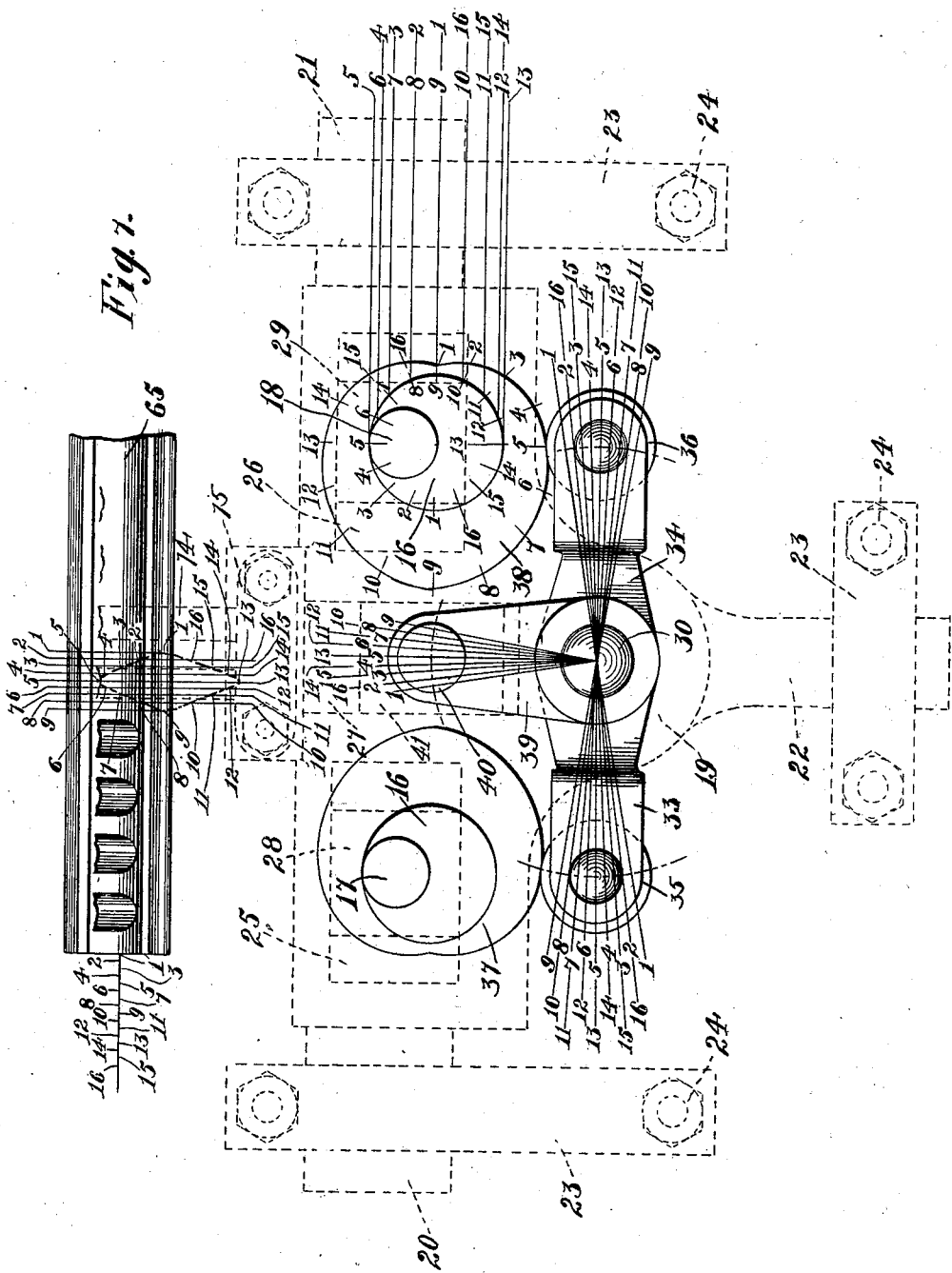

UNITED STATES PATENT OFFICE.

FRANCIS H. RICHARDS, OF HARTFORD, CONNECTICUT.

CARVING-MACHINE.

No. 888,534.　　　　Specification of Letters Patent.　　Patented May 26, 1908.

Application filed August 16, 1902, Serial No. 119,841. Renewed October 28, 1905. Serial No. 284,807.

*To all whom it may concern:*

Be it known that I, FRANCIS H. RICHARDS, a citizen of the United States, residing at Hartford, in the county of Hartford and State of Connecticut, have invented certain new and useful Improvements in Carving-Machines, of which the following is a specification.

My invention pertains to machines for carving repeat ornaments or a repeating series of ornaments on wood, moldings or the like, and more particularly relates to machines of the above-described class in which a plurality of cutting elements are caused to make meeting incisions in the stock to form the desired configuration.

Some of the objects of my invention are to provide a uniform continuous-feed carving machine, to provide mechanism whereby the tools may be accurately operated in conjunction with the feed and coöperate to a nicety; to provide a mechanical structure of this class which will be simple, compact and capable of operation at high speeds without deleterious results, and to provide such a machine wherein that portion of the mechanism subject to corruption or destruction or dangerous to operatives, shall be protected and preserved or guarded as the case requires.

I have illustrated one embodiment of my invention in a carving machine in the drawings forming part of this specification, in which like reference characters refer to like parts throughout the several views.

Figure 2:
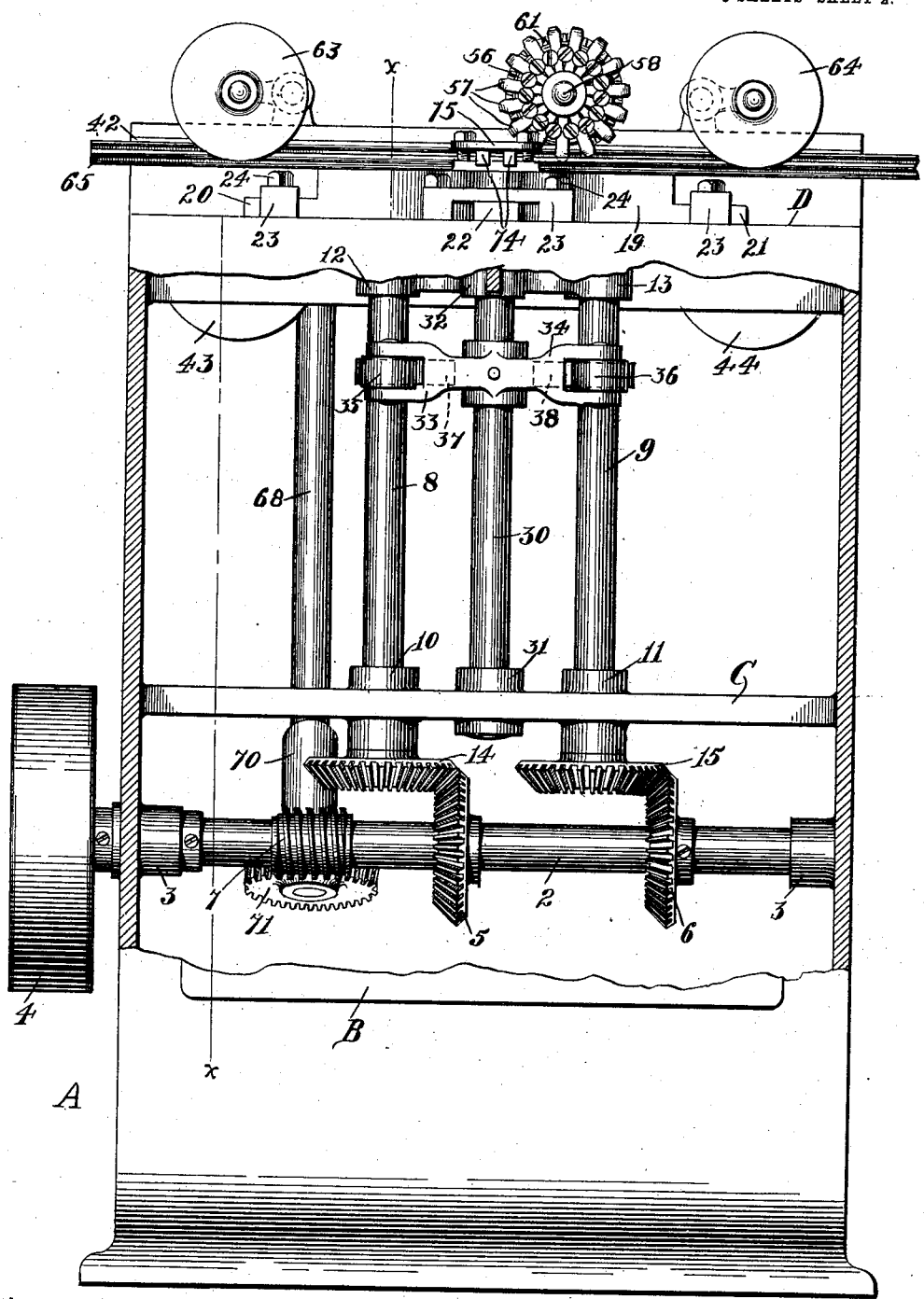

Figure 1 is a front elevation partly in section on line *x—x* of Fig. 2; Fig. 2, a side elevation showing a portion of the side wall broken away; Fig. 3, a plan view; Fig. 4, a horizontal sectional detail on line *y—y* of Fig. 1 looking upward; Fig. 5, a detail of the upper left hand side of the machine showing left wall broken away; Fig. 6, a detail in perspective of the top and the tool carriage; and Fig. 7, a diagrammatical plan indicating by numerals 1 to 16, sixteen consecutive positions of the several parts during one revolution of the drive shaft.

Referring to the drawings, and the machine illustrated herein this is shown supported by and assembled in and upon a box-like frame A, access to the interior of which is had through an opening in one side wall, which opening is closed by a door B hinged upon said frame A.

A horizontal driving shaft 2 is mounted longitudinally of the machine in bearings 3, 3, in the end walls of frame A projecting without said frame and provided upon its projecting portion with a main driving pulley 4. Upon that portion of the shaft 2 lying entirely within the frame A are mounted fast two miter gears 5 and 6 and a worm 7.

A beam C is cast or otherwise secured in the frame A, parallel with and directly above the shaft 2, said beam being supported by the walls of the frame A at either end in the particular construction illustrated.

Vertically disposed shafts 8 and 9 are respectively mounted in bearings 10 and 11 in the beam C, and supported respectively near their upper ends in journal bearings 12 and 13 in the table D forming in the present illustration a portion of the top of frame A. The vertical shafts 8 and 9 are respectively provided at their lower extremities with fast miter gears 14 and 15 respectively meshing with miter gears 5 and 6 on shaft 2, driving shafts 8 and 9 at the same speed as that of shaft 2 and in like directions. The vertical shafts 8 and 9 each carry a crank disk 16 which disks lie in circular depressions in the top or table D with their upper surfaces flush with the upper face of said table D. The crank disks 16 on the shafts 8 and 9 respectively carry wrist pins 17 and 18, set with like radii and to effect a parallel movement.

The machine frame in the present illustration constitutes a support for a carrier or tool carriage 19 and will have guide faces upon which the carriage may lie flat, this portion of the machine frame is in the nature of a table D. The carriage is shown provided with a plurality of guides, illustrated in the form of extensions 20 and 21, respectively, at its ends and an extension 22 at its rear side which may be in the form of arms as illustrated. There is thus provided a triangulation of guides having guide faces on one side for engaging those on the support and guide faces on the opposite side for engaging with coöperative guides, illustrated herein in the form of retaining bridges 23, secured to the table D by bolts 24 or otherwise, and extending over and engaging the said extensions 20, 21 and 22 for preventing the rise of the carriage 19 from the guide surface upon which it rests. The bridges are formed with spans sufficiently long to allow a considerable degree of movement of the said carriage 19 on the surface of said table D. The length of the extensions 20, 21, and 22 and the positions of the bridges 23 are such that a long leverage is had preventing the carriage 19 from tipping upward from the table D with little strain on the said bridges and extensions. The bridges 23 keep the carriage 19 down upon the surface of the table D at all times. The carriage 19 is recessed in its underside to form two alined longitudinal guideways 25 and 26 and a transverse guideway 27 (see Fig. 7).

Upon the wrist pins 17 and 18 on crank disks 16 are respectively mounted boxes 28 and 29 which boxes are adapted to respectively engage the guideways 25 and 26 in the under surface of the carriage 19 and impart the diametral movement of the crank disks 16 transversely to the carriage 19 while admitting of a free longitudinal movement of said carriage.

A vertical oscillatable shaft 30 is mounted midway between the shafts 8 and 9 and to one side of the plane of mounting of said shafts 8 and 9 in a bearing 31 in the beam C and a bearing 32 in the table D. The shaft 30 is provided with two oppositely disposed radial arms 33 and 34 respectively carrying at their outer ends loose rollers 35 and 36. The rollers 35 and 36 are adapted to respectively contact at all times with cams 37 and 38 fast on shafts 8 and 9. In constructing the cams 37 and 38 the peripheral form thereof should be constructed to accurately correspond so as to keep a close and proper working contact between the cams and the respective ends or rollers on the ends of the rocker arms 33 and 34. An arm 39 is mounted fast on the upper end of shaft 30 at right angles to the arms 33 and 34 and works in a depression in the upper surface of table D in such manner that its upper surface lies flush with the upper surface of table D. The arm 39 is provided with a wrist pin 40 upon which a box 41 is mounted said box 41 being adapted to engage the guideway 27 in the underside of the carriage 19 and impart a longitudinal movement to said carriage when shaft 30 is oscillated while admitting of a free transverse movement of said carriage. The cams 37 and 38 are complementary and are designed to oscillate shaft 30 when the shafts 8 and 9 are rotated to effect a uniform movement of the carriage 19 in one direction at least through approximately one-half revolution of the shafts 8 and 9. The cams 37 and 38 are set with relation to the crank wrists 17 and 18 in such manner as to effect the extreme lateral movement of the carriage 19 at the center of the uniform longitudinal movement of said carriage.

It will be noticed that the action of the crank pins 17 and 18 together with that of the arm 39 result in a circuitous translational movement of the carriage 19 during a portion of the revolution of the shafts 8 and 9, the longitudinal diametral movement being uniform.

To one side of the table D the top of the frame A is raised above the level of said table and a stock guide 42 is formed upon one edge of said raised portion. The stock guide 42 is parallel with the table D and runs longitudinally of the frame A parallel at all times with the carriage 19. Feed rolls 43 and 44 respectively fast on shafts 45 and 46 project from within the frame A through apertures in the floor of the stock guide 42 at either side of the center of the table D until their peripheries just rise above said floor of the stock guide 42. The shaft 45 is mounted in a bearing 47 in the casting of table D and a bearing 48 in the side wall of the frame A. The shaft 46 is mounted in a bearing 49 in the casting of table D and a bearing 50 in the side wall of the frame A. The shafts 45 and 46 respectively carry fast spiral gears 51 and 52 which mesh with spiral gears 53 and 54 fast on a shaft 55 at right angles to the shafts 45 and 46 and are driven synchronously in the same direction.

A rotary cutter 56 having radially directed tools 57 disposed about its periphery is mounted fast on a shaft 58 which shaft 58 is mounted in bearings 59 and 60 upstanding from the raised portion of the frame A and is parallel to the shafts 45 and 46. A spiral gear 61 fast on shaft 58 meshes with a spiral gear 62 fast on shaft 55. The gearing just described which drives the rotary cutter and the feed rolls is proportioned to effect a rotation of the said rotary cutter in the opposite direction to that of the feed rolls and to maintain equal velocities of the active peripheries of both the feed rolls and the rotary cutter. Presser rolls 63 and 64 are mounted directly above the feed rolls 43 and 44 and are pressed upon the stock 65 which lies in the stock guide by springs 66 and 67.

A shaft 68 is mounted in bearings 69 and 70 projecting from the side wall of the frame A and carries fast on its lower end a worm-wheel 71 which meshes with the worm 7 on shaft 2 and is driven thereby and fast on its upper end a spiral gear 72 which meshes with a spiral gear 73 fast on shaft 55 and drive said shaft. The gearing from shaft 2 to the feed rolls and the rotary cutter is proportioned to effect a velocity of the active peripheries of the feed rolls and rotary cutter equivalent to the velocity of the carriage 19 during its period of uniform movement and to move the feed rolls in a direction to feed stock in the direction of said uniform movement of the carriage. It will therefore be seen that stock engaged by the feed rolls and moving along the stock guide will be followed by the carriage, the carriage remaining exactly opposite a given point upon the stock during said uniform movement. And it will also be seen that during this time the carriage 19 will move toward the stock and away from the same. In the particular form illustrated I have shown two tools 74 mounted upon the carriage 19 and held thereon by a clamp 75. The tools in the present case are a couple of gouges and are designed to make incisions in the moving stock and be withdrawn during the uniform movement of the carriage with the stock, said incisions forming part of the contour of two ornaments or parts of the contour of a single ornament.

The radially directed tools 57 on the rotary cutter are configured in such a manner that they will make incisions in the moving stock exactly registering with the incisions made by the tools 74 and chipping out the wood to form the ornament. The rotary cutter makes a continuous line of incisions upon the moving stock and is in engagement with the stock at all times, but the carriage 19 as the device is illustrated, makes two incisions, withdraws the tools and returns them to the initial position and repeats the operation upon a succeeding portion of the stock ultimately effecting a continuous series of ornaments. The gearing is proportioned to move the stock during the return of the carriage 19 exactly the distance of the surface of said stock completed in one operation of the tools 74, while the rotary cutter is made to accord. The resistance offered to the tools 74 when the machine is working at a high rate of speed would tend to rotate the carriage 19 from the plane of the table D, but the extensions of said carriage maintain the same in a proper plane and their great leverage avoids any very great strains upon the parts.

It will be noted that the carriage 19 at all times covers up its actuating mechanism preventing dust and other objectionable matter from entering the interior of the frame A in which practically all of the mechanism is inclosed. It is obvious that various changes may be made in the details of construction and arrangement of this invention without departing from the principles involved and the spirit of my invention.

Having described my invention, I claim—

1. In a carving machine, the combination of a supporting table, a carrier mounted upon said table and adapted to be translated in a non-rectilinear circuitous path thereon, a plurality of arms extending from said carrier, and overlying bridges rigid with said table and each spanning a distance greater than the width of the arm it overlies.

2. In a carving machine, the combination of a supporting table, a carrier mounted upon said table and adapted to be translated in a non-rectilinear circuitous path thereon, a plurality of arms extending from said carrier, and at least one of which is elongated in a relatively transverse direction to the others and overlying bridges rigid with said table and each spanning a distance greater than the width of the arm it overlies.

3. In a carving machine, the combination of a supporting table, a carrier mounted upon said table to translate thereon in a circuitous path, a plurality of arms extending from said carrier forming continuation of its under surface, and overlying bridges rigid with said table and each spanning its underlying arm in close proximity to the upper surface of the latter for a distance greater than the width of the arm to thereby prevent the rising of said carrier from the surface of said table while admitting of the circuitous translation of said carrier.

4. In a carving machine, the combination of a supporting table, a carrier mounted upon said table to translate thereon in a circuitous path, a plurality of arms upon said carrier forming continuation of the under surface thereof and one at least of which is elongated in a relatively transverse direction to the others, and overlying bridges rigid with said table, each bridge being located at a distance from the body of said carrier and spanning its underlying arm for a distance greater than the width of the arm to thereby exert long leverages on said carrier and prevent the rise of said carrier from the surface of said table while admitting of the circuitous translation of said carrier.

5. In a carving machine, the combination of a supporting table, a carrier mounted upon said table to translate thereon in a circuitous path, arms extending from the carrier in opposite directions, an arm also extending from said carrier transversely to said oppositely extending arms and bridges rigid with said table and overlying said arms to prevent the rise of said carrier from said table, the spans of said bridges being of such length as to permit of the translation of said carrier in a circuitous path upon said table.

6. In a carving machine, the combination of a supporting table, a carrier mounted upon said table, circuitously translating mechanism protruding through said table and engaging the underside of said carrier, a plurality of arms extending from said carrier, and one at least of which is elongated in a relatively transverse direction to the others and bridges having a longer span than the width of the respective underlying arms rigid with said table and overlying said arms to prevent the rise of said carrier from the surface of said table while admitting of the circuitous translation of said carrier by said mechanism.

7. In a carving machine, the combination of a supporting table, a carrier mounted upon said table to translate thereon in a non-rectilinear circuitous path, a plurality of relatively transversely disposed arms extending from said carrier, and bridges fixedly secured to said table and overlying said arms to prevent the rise of said carrier from the surface of said table, the spans of said bridges being of such length as to permit of the circuitous translation of said carrier.

8. In a carving machine, the combination of a supporting table, a carrier mounted upon said table to translate thereon in a circuitous path, a plurality of parallel guide ways in the under surface of said carrier, a guide way in the under surface of said carrier transverse of said parallel guide ways, a plurality of equal-throw synchronously acting cranks protruding through said table beneath said carrier and respectively engaging said parallel guide ways, an oscillating crank protruding through said table beneath said carrier and engaging said transverse guide way, operatively connected mechanism actuating said cranks to effect a circuitous translation of said carrier upon said table, a plurality of arms projecting from said carrier, and bridges fixedly secured to said table and overlying said arms to prevent the rise of said carrier from the surface of said table, said bridges having spans of such length as to permit of the circuitous translation of said carrier without a disengagement of said arms and said bridges.

9. In a carving machine, the combination with a frame and a table upon said frame, of a carrier mounted upon said table to translate thereon in a circuitous path, a plurality of parallel guide ways in the under surface of said carrier, a guide way in the under surface of said carrier transverse of said parallel guide ways, a plurality of parallel shafts protruding through said table, equal-throw synchronously acting cranks upon said shafts engaging said parallel guide ways, a driving shaft geared with and to rotate said parallel shafts synchronously, complementary cams upon said parallel shafts, an oscillatable shaft protruding through said table, a crank upon said oscillatable shaft engaging said transverse guide way, a rocking beam fast on said oscillatable shaft, and contact members carried at either end of said rocking beam and engaging said cams upon the same side of the plane of mounting of said parallel shafts.

10. In a carving machine, the combination of a driving shaft, a pair of parallel shafts geared to and driven from said driving shaft to rotate synchronously, a pair of parallel equal-throw cranks respectively mounted fast upon said parallel shafts, an oscillatable beam pivoted at a point equidistant to said parallel shaft and to one side of the plane of mounting of said parallel shaft, complementary cams respectively mounted upon said parallel shafts and set to complement upon substantial perpendiculars to the plane of mounting of said parallel shaft, said rocking beam engaging each of said cams upon the same side of the plane of mounting of said parallel shaft and actuated by said cams, a crank mounted fast with said rocking beam, and a tool carriage having parallel guide ways engaged by said synchronously acting cranks and a guide way transverse of said parallel guide ways engaged by said oscillating crank to effect a circuitous translation of said tool carriage.

11. In a carving machine, a circuitously translatable tool carriage, actuating mechanism for said tool carriage consisting of a pair of synchronously rotating cranks, an oscillatable crank and cams mounted fast with said synchronously rotating cranks for actuating said oscillatable crank, a driving shaft geared to and driving said tool carriage actuating mechanism and feed rolls and a rotary tool head geared to and driven from said driving shaft in phase with said tool carriage independently of said carrier actuating mechanism.

12. In a carving machine, the combination with a tool carriage, of means for circuitously translating said carriage and comprising slideways on said carriage, one of which is transverse to the others, slides in said ways, cranks engaging said slides, means for revolving the cranks except the transverse crank, and means for oscillating the same in unison with the revolution of the other cranks.

13. In a carving machine, the combination with a tool carriage provided with parallel slide ways and a slide way disposed transversely thereto, slides in said ways, parallel equal throw cranks for engaging said parallel slides, means for revolving said cranks and imparting a reciprocatory motion to the carriage, a crank for engaging the transverse slide, and equal throw cams controlled by said parallel cranks for oscillating said crank for circuitously translating said carriage.

14. In a carving machine, the combination with a tool carriage, having parallel guideways, of slides mounted in said guideways, a pair of parallel equal throw cranks engaging said slides, means for revolving said cranks, said carriage also having a transverse guideway, a slide mounted therein, a crank engaging said slide, and means for oscillating said crank in unison with the revolution of said pair of cranks, the timing and adjustment of the parts being such that the tool carriage will be translated in a circuitous path.

15. In a carving machine, the combination with a support having guide faces; of a tool carrier mounted thereon and provided with a plurality of rigidly connected guiding portions having upon one side guide faces for engaging the guide faces on the support, and guide faces on the opposite side for the engagement of guides, coöperative with the guide faces on the support, for holding said carrier to movement in a plane parallel with the plane of the support; a plurality of guides carried by the support for engaging the faces on said opposite side of said guiding portions for permitting movement of the carrier in a non-rectilinear circuit; and means for translating said carrier in a non-rectilinear path.

16. In a carving machine, the combination with a support provided with a stock guide and carrier guiding faces, of a tool carrier having a tool seat and a plurality of rigidly connected guiding portions, these being disposed at the respective sides and rear of the tool seat, means for engaging said guiding portions and holding these to the guide faces on the support, for permitting movement of the carrier in a non-rectilinear circuit means for translating said carrier in a non-rectilinear circuitous path for projecting the tools into and out of the path of stock movement, and means for feeding stock along said stock guide.

FRANCIS H. RICHARDS.

Witnesses:
 MARCUS C. HOPKINS,
 FRED J. DOLE.